US008046834B2

(12) United States Patent
Flynn et al.

(10) Patent No.: US 8,046,834 B2
(45) Date of Patent: Oct. 25, 2011

(54) METHOD OF POLYMORPHIC DETECTION

(75) Inventors: Lori Arline Flynn, New York, NY (US); Gerald R. Thompson, Somerset, NJ (US)

(73) Assignee: Alcatel Lucent, Paris (FR)

( * ) Notice: Subject to any disclaimer, the term of this patent is extended or adjusted under 35 U.S.C. 154(b) by 1425 days.

(21) Appl. No.: 11/093,303

(22) Filed: Mar. 30, 2005

(65) Prior Publication Data

US 2006/0230453 A1    Oct. 12, 2006

(51) Int. Cl.
*G06F 11/30* (2006.01)
*G06F 12/14* (2006.01)
*H04L 9/32* (2006.01)

(52) U.S. Cl. ............. 726/24; 726/23; 713/180; 713/188

(58) Field of Classification Search .................... 725/20; 713/180, 188; 726/23, 24
See application file for complete search history.

(56) References Cited

U.S. PATENT DOCUMENTS

| 5,684,875 | A | * | 11/1997 | Ellenberger | ............... 482/4 |
| 5,696,822 | A |   | 12/1997 | Nachenberg | |
| 5,826,013 | A |   | 10/1998 | Nachenberg | |
| 5,964,889 | A |   | 10/1999 | Nachenberg | |
| 6,067,410 | A | * | 5/2000  | Nachenberg | ............... 703/28 |
| 6,775,780 | B1 |  | 8/2004  | Muttik | |
| 6,851,057 | B1 | * | 2/2005  | Nachenberg | ............... 726/24 |
| 6,971,019 | B1 | * | 11/2005 | Nachenberg | ............... 713/188 |
| 6,973,577 | B1 | * | 12/2005 | Kouznetsov | ............... 726/25 |
| 7,502,939 | B2 | * | 3/2009  | Radatti | ............... 713/188 |
| 2004/0083366 | A1 | * | 4/2004  | Nachenberg et al. | ......... 713/170 |
| 2004/0181687 | A1 | * | 9/2004  | Nachenberg et al. | ......... 713/201 |
| 2004/0236884 | A1 | * | 11/2004 | Beetz | ............... 710/68 |
| 2005/0028002 | A1 | * | 2/2005  | Christodorescu et al. | ..... 713/200 |
| 2005/0028146 | A1 | * | 2/2005  | Quick | ............... 717/130 |
| 2005/0086502 | A1 | * | 4/2005  | Rayes et al. | ............... 713/189 |
| 2005/0283838 | A1 | * | 12/2005 | Saito | ............... 726/24 |

OTHER PUBLICATIONS

Christodorescu, M. et al., "Semantics-Aware Malware Detection," IEEE Symposium on Security and Privacy, May 9, 2005.
Halvar Flake, "Structural Comparison of Executable Objects", AbsInt Angewandte Informatik BmbH. 2000.
Sanjay Goel, "Kolmogorov Compexity Estimates for Detection of Viruses in Biologically Inspired Security Systems: A Comparison With Traditional Approaches", Complexity Journal, vol. 9, issue 2, Nov.-Dec. 2003, Special Issue, pp. 1-45.
Todd Sabin, "Comparing binaries with graph isomorphisms", pp. 1-24 http://www.bindview.com/support/razor/papers/2004/comparing_binaries.cfm.
Understanding Heuristics: Symantec's Bloodhound Technology, Symantec White Paper Series, vol. XXXIV.
Understanding and Managing polymorphic Viruses, The Symantec Enterprise Papers, vol. XXX.
Péter Ször et al., "Hunting for Metamorphic", Symantec Security Response, White Paper, pp. 1-24.

* cited by examiner

*Primary Examiner* — Mohammad W Reza
(74) *Attorney, Agent, or Firm* — Harness, Dickey & Pierce

(57) ABSTRACT

A computer program signature may be determined based on the function flow grammar for a given source code. The function flow grammar may be determined based on reduced control flow graphs generated based on control flow graphs for each function within the source code. A polymorph of a computer program may be detected by comparing the determined computer program signature with computer program signatures, which may be included in a database.

14 Claims, 7 Drawing Sheets

FIG. 4
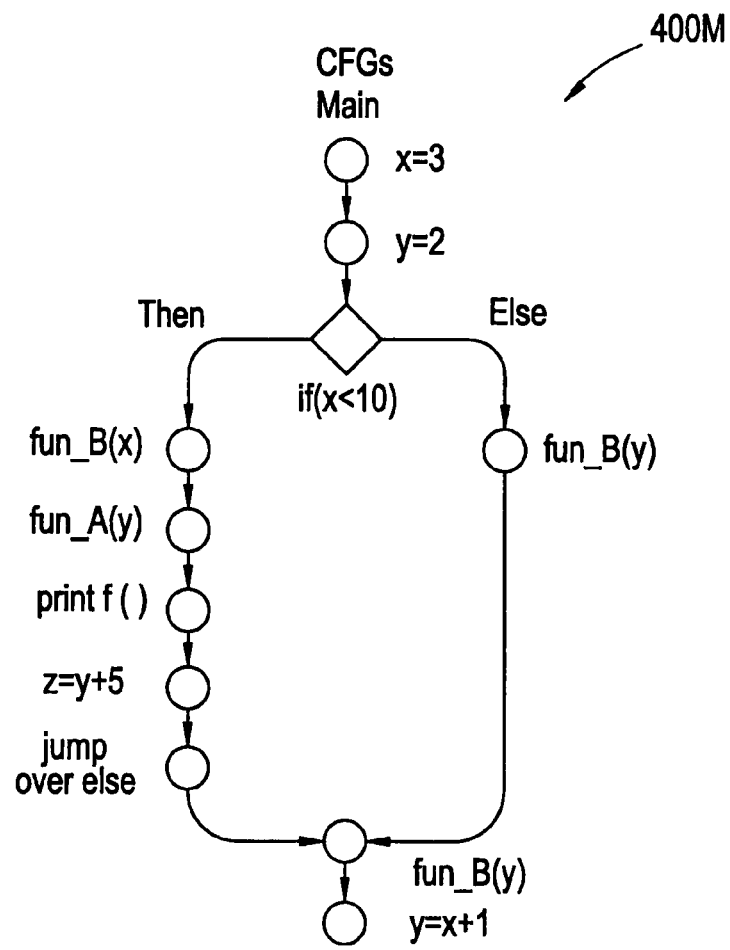
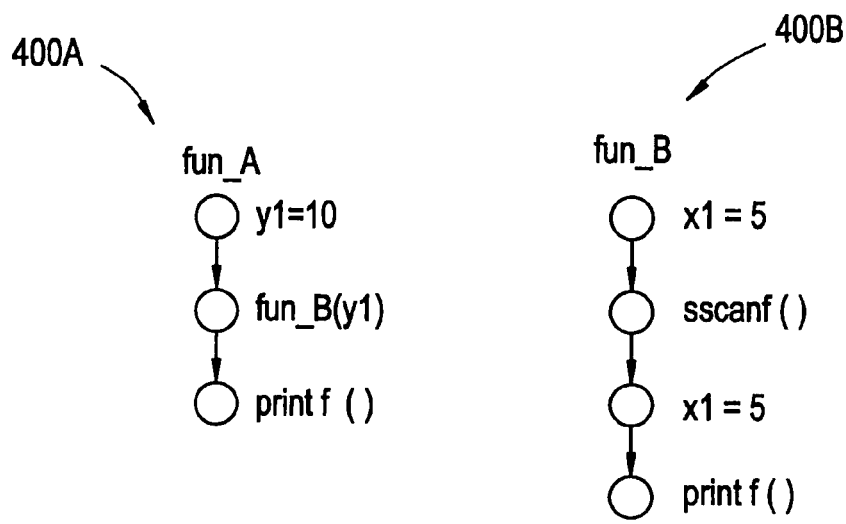

FIG. 5
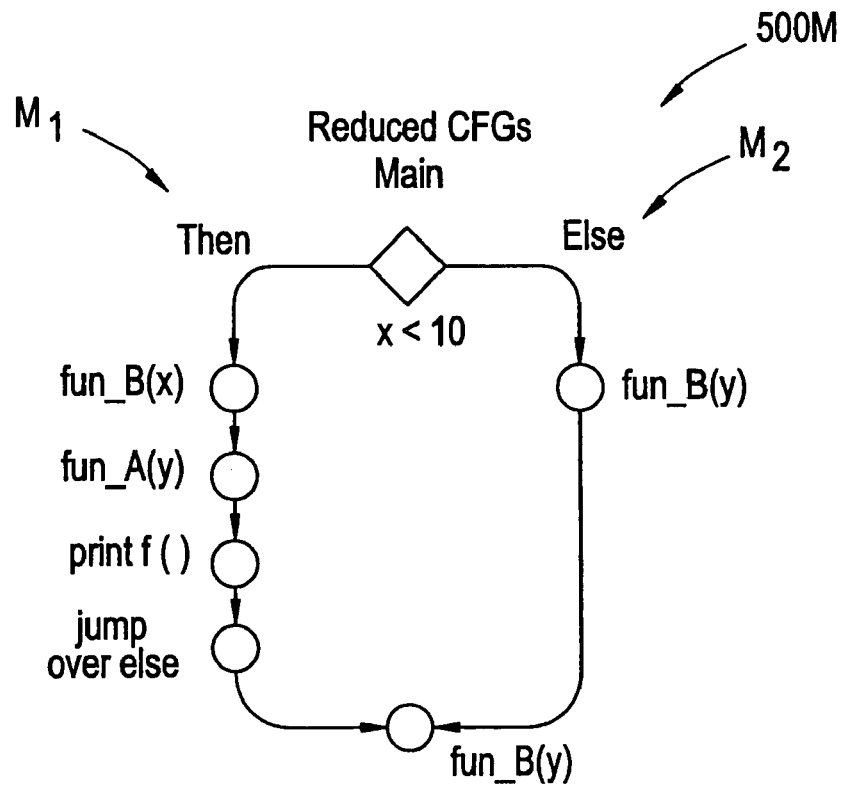
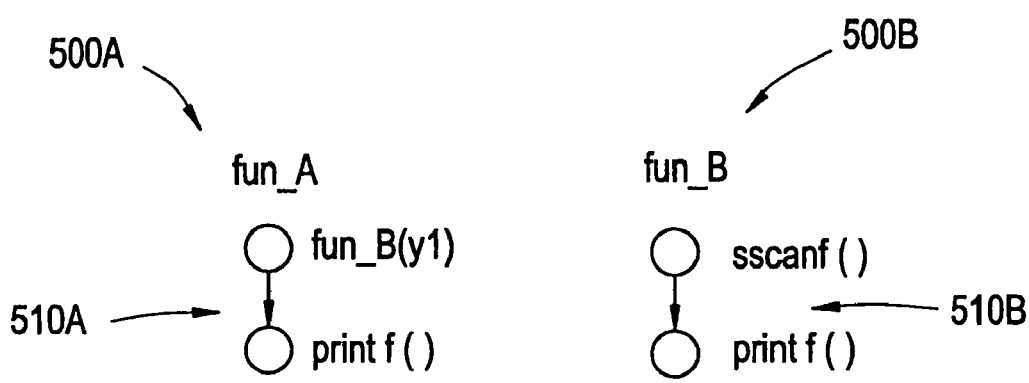

METHOD OF POLYMORPHIC DETECTION

FIELD OF THE INVENTION

Example embodiments of the present invention relate to methods for generating computer program signatures and/or detecting polymorphic instances of computer programs.

BACKGROUND OF THE INVENTION

Polymorphic computer programs are computer programs, which have object code that varies between instances of the computer program. For example, polymorphic viruses are computer viruses, which have object code that varies between instances of the virus. Polymorphic viruses or computer programs may also be referred to as metamorphic or permuting. Some well-known methods of permutations and some polymorphs, for example, Win95/Bistro may perform combinations of types of permutations. In the alternative, some polymorphic replicators may be encrypted and decrypted using varying keys, which may change the object code of the virus before decryption.

Polymorphs such as, for example, Zperm may create varying copies of their own opcodes, which may perform the same tasks as the original opcodes. Other polymorphs such as, for example, Lexotan and W95/Puron may execute the same opcodes in the same order, but insert filler (or garbage) instructions and/or jumps between executed instructions. Other computer viruses may reorder their own subroutines (e.g., the Win32/Ghost virus), and/or recompile themselves into a polymorphic form with inserted filler (or junk) code on an infected machine with a compiler (e.g., Win32/Apparition).

Existing flow-graph-based commercial polymorph detectors may use, for example, reverse engineering and/or flow graphs including lines of assembly code. In one example, control flow graphs for functions may be mapped while ignoring instruction reordering and changes in register functions. A computer program may be reverse engineered and organized into a function call graph, with each function internally represented as a control flow graph.

In another example, a control flow graph including nodes, which are lines of assembly code may be created. In this example, matching may be automated, including, for example, recognition of opcodes, which may perform the same operation but have a different name. However, in this example, a human must recognize shuffled opcodes within remaining unmatched code.

In yet another example, polymorphs may be detected using both static and dynamic analysis. For example, a virtual computer may be created within a computer system for executing potentially infected files. A static analysis may use a byte sequence signature string analysis with wildcards for areas with varying opcodes. Byte sequence signature strings may be referred to as behavior signatures. A dynamic analysis may run the object code within an emulator (virtual computer), and may track the system requests (i.e., interrupt calls).

In another example, autoimmune systems may profile a computer or network to identify a normal state of self, for example, in terms of typical network connections and/or system calls. Regular checks of current state may then be compared to the stored profile. Unusual activity due to a virus, including polymorphic viruses, may be detected using these autoimmune systems.

SUMMARY OF THE INVENTION

Example embodiments of the present invention provide methods for determining a computer program signature (e.g., a polymorphic signature), and/or detecting a polymorph of a known computer program.

In an example embodiment of the present invention, a signature for a computer program may be determined based on a total ordering of functions within the computer program.

In another example embodiment of the present invention, functions within a computer program may be identified and at least one control flow graph may be generated for the computer program based on the identified functions. At least one reduced control flow graph may be generated by reducing the generated control flow graph, and a function flow grammar may be generated using identified functions associated with static address information included in the reduced control flow graph. A signature may be determined by ordering the identified functions of the function flow grammar based on at least one characteristic associated with each function.

In another example embodiment of the present invention, a signature of a suspect computer program may be generated based on a total ordering of functions within the suspect computer program. The determined signature may be compared with a plurality of known computer program signatures, which may also be based on total ordering of functions within the known computer programs.

In example embodiments of the present invention, the at least one characteristic may be a relative complexity of each function in the function flow grammar. The relative complexity of each function may be a tuple including at least one value and/or based on a quantitative analysis of each function.

In example embodiments of the present invention, the at least one characteristic may be a label given to each function in the function flow grammar. The label given to each function may be based on an original call order of the functions in the computer program.

In example embodiments of the present invention, functions within a computer program may be identified, and at least one control flow graph may be generated for the computer program based on the identified functions. At least one reduced control flow graph may be generated based on the control flow graph, and function flow grammar including the identified functions associated with static address information may be created based on the reduced control flow graph. A signature may be determined for the computer program by ordering the identified functions in the function flow grammar based on the at least one characteristic.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein:

FIG. 4 illustrates example control flow graphs, which may be used in a method for generating a computer program signature, according to an example embodiment of the present invention;

FIG. 5 illustrates example reduced control flow graphs, which may be used in a method for generating a computer program signature, according to an example embodiment of the present invention;

DETAILED DESCRIPTION OF THE EXAMPLE EMBODIMENTS

Figure 1:
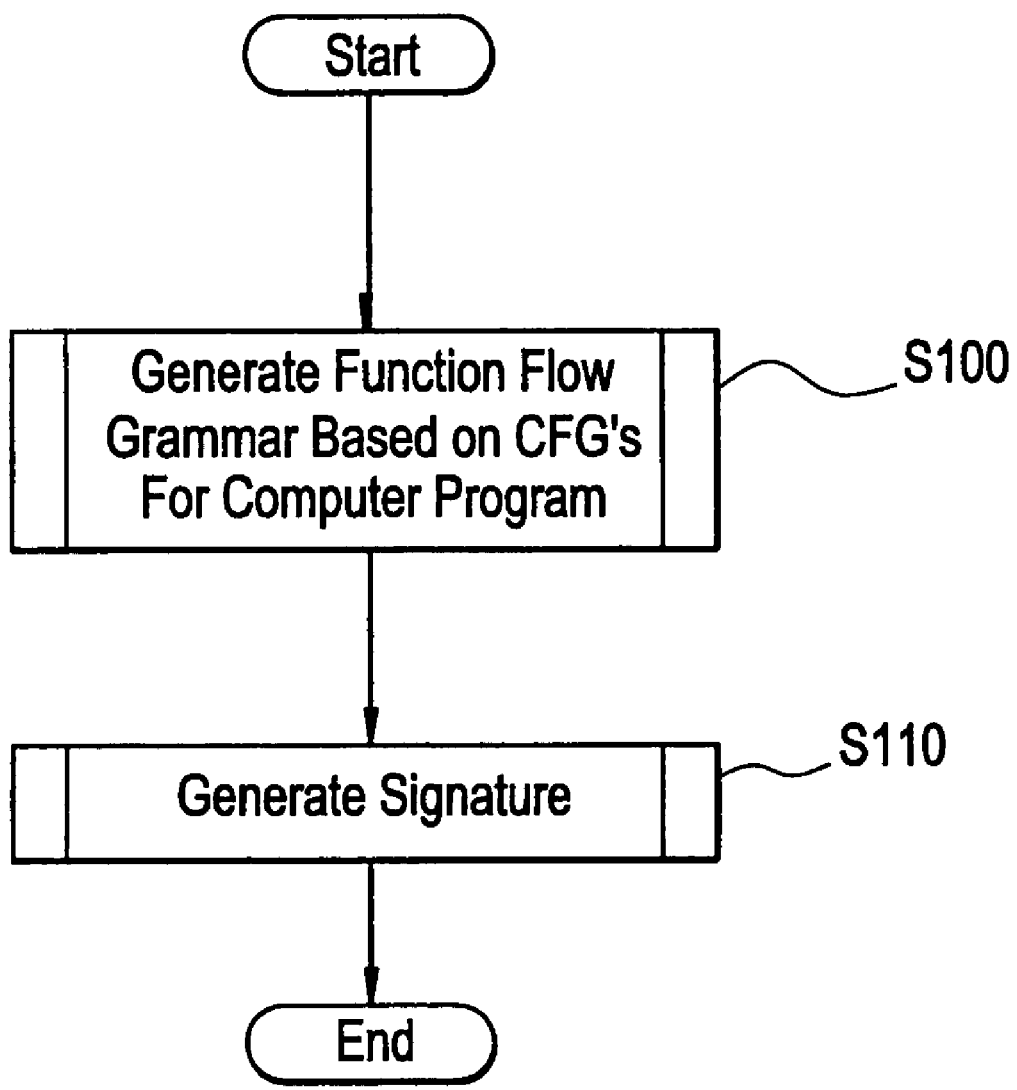
FIG. 1 shows a flow chart illustrating a method for determining a signature of a computer program, according to an example embodiment of the present invention.

Example embodiments of the present invention provide a method for determining a signature (e.g., a polymorphic signature) of a computer program. Example embodiments of the present invention also provide a method for detecting a polymorphic variant (i.e., polymorph) of a known computer program. The polymorphic variant may be, for example, a polymorphic virus, pirated computer software, etc.

Example embodiments of the present invention may make use of isomorphism between polymorphic variants of computer programs. As discussed in the background section, polymorphic computer programs (e.g., metamorphic or permuting programs) may be computer programs with varying object or source code between instances of the computer program.

An original and polymorphic instance of a computer program may be isomorphic, for example, if the structure of the control flow graphs associated with each instance are the same. Example embodiments of the present invention may match functions of an original and polymorph computer program instance using a total ordering of functions within the computer programs as computer program signatures. The total ordering of the functions may be based on generated function flow grammar. In this disclosure, the original instance and the polymorphic instance of a computer program may also be referred to as computer programs themselves.

In an example embodiment of the present invention, a graphical representation may be constructed in order to determine if a suspect computer program is a polymorphic variant of a known computer program. For example, higher order properties of a suspect computer program, which may remain constant between polymorphic variants of known programs, may be analyzed in order to determine if the suspect computer program is a polymorphic variant of a known program.

Examples of higher order properties of programs are control flow graphs, function call graphs, context-free grammar, control flow grammar, function flow grammar, and code dependency graphs associated with each function within a computer program. A context-free grammar may be a 4-tuple, which may include terminals (T, e.g., non-functions), non-terminals (N, e.g., functions), an initial non-terminal (S, e.g., an entry point), and a set of productions (P). The productions (P) may be paths from non-terminals (N) to strings of terminals (T) and non-terminals (N).

A control flow grammar is a particular type of context-free grammar, which includes functions, statements (excluding function calls), and productions. In a control flow grammar, N may represent a set of functions, T may represent a set of statements (excluding function calls), S may represent a main function, and P may represent acyclic intra-function execution paths known as, for example, control flows or productions. Each control flow or production may further include terminals (non-function calls) and non-terminals (function calls).

A function flow grammar is a modified control flow grammar obtained by removing the terminals (non-function calls) from the productions within the control flow grammar. That is, removing the set T from the control flow grammar, as discussed above.

FIG. 1 illustrates an example of a method for determining a computer program signature, according to an example embodiment of the present invention. It will be understood that the example embodiment of the method as illustrated in FIG. 1 may be implemented, for example, in the form of instructions stored on a computer readable medium (e.g., a memory, cd-rom, etc.), which may be executed using any suitable computer platform. As shown in FIG. 1, at step S100, a function flow grammar may be generated based on control flow graphs generated for functions in the source code of a computer program. The function flow grammar may include symbolic representations of each path in reduced versions of each control flow graph (i.e., reduced control flow graphs, which will be described in more detail below). As discussed above, each function flow grammar may exclude instructions (e.g., statements T, excluding function calls), which may determine control structure of the respective functions. For example, the function flow grammar may exclude branch conditions, jump instructions, etc. A method for generating a function flow grammar for a computer program, according to an example embodiment of the present invention, will be discussed in more detail below with regard to FIG. 3.

Next, at step S110, a computer program signature may be generated based on the function flow grammar generated in step S110. A method for generating a computer program signature based on the function flow grammar, according to an example embodiment of the present invention, will be described in more detail below with regard to FIG. 6.

Figure 2:
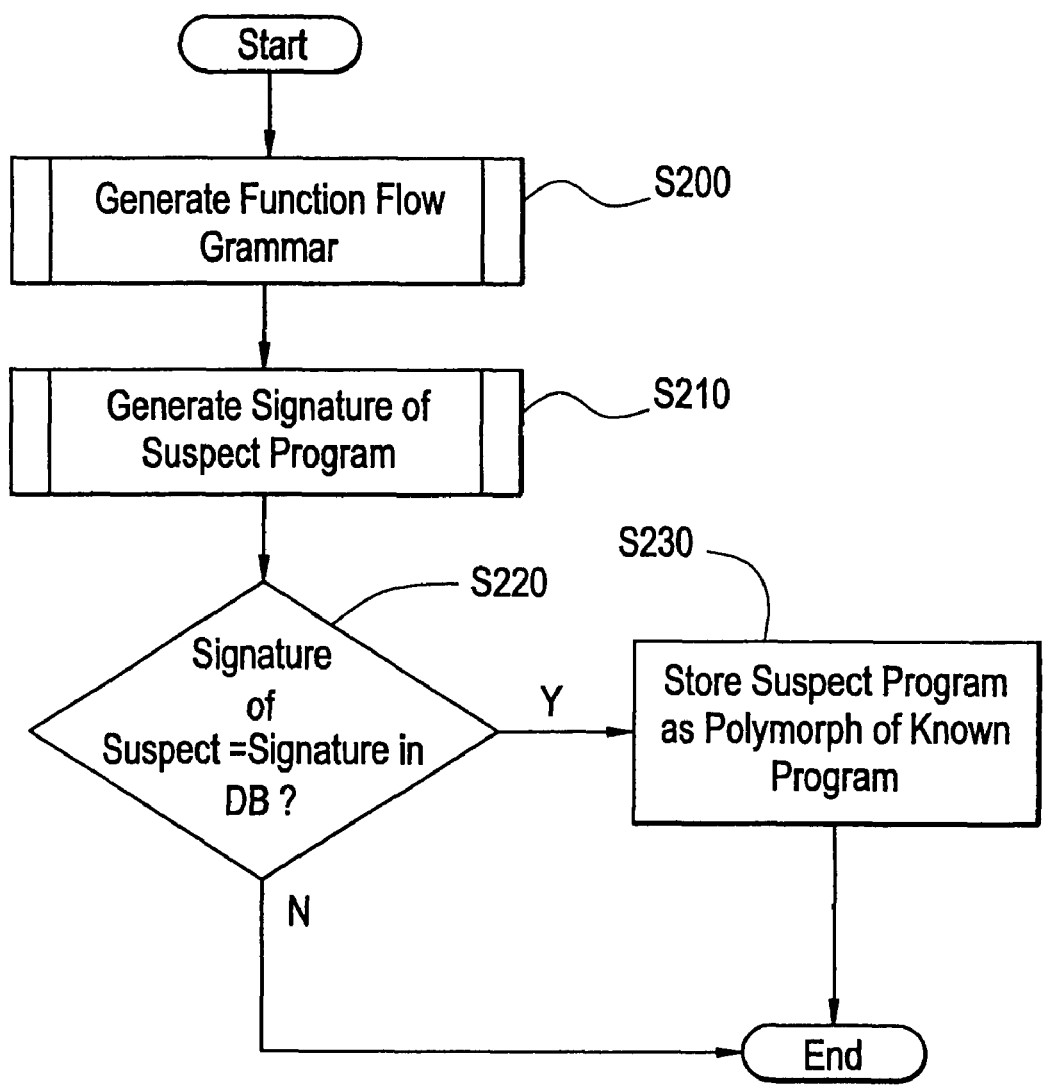
FIG. 2 shows a flow chart illustrating a method for detecting a polymorph of a computer program, according to an example embodiment of the present invention.

FIG. 2 illustrates an example of a method for detecting whether a suspect computer program is a polymorph of a known computer program, according to another example embodiment of the present invention. It will be understood that the example embodiment of the method as illustrated in FIG. 2 may be implemented, for example, in the form of instructions stored on a computer readable medium (e.g., a memory, cd-rom, etc.), which may be executed using any suitable computer platform.

As shown in FIG. 2, step S200 may be the same as step S100 of FIG. 1. That is, a function flow grammar may be generated based on control flow graphs for functions included in the source code of a suspect computer program. The function flow grammar may include symbolic representations (e.g., labels) of each path in reduced versions of each of the control flow graphs (e.g., reduced control flow graphs, which will be described in more detail below). For example, each function flow grammar may exclude instructions (e.g., statements T excluding function calls), which may determine control structure of the respective functions. For example, the function flow grammar may exclude branch conditions, jump instructions, etc. As discussed above, a method for generating a function flow grammar for a computer program, according to an example embodiment of the present invention, will be discussed in more detail below with regard to FIG. 3.

Referring back to FIG. 2, as shown, step S210 may be the same as step S110 of FIG. 1. That is, a signature for the suspect computer program may be generated based on the function flow grammar generated in step S200. As discussed above, a method for generating a computer program signature based on the function flow grammar, according to an example embodiment of the present invention, will be described in more detail below with regard to FIG. 6.

At step S220, the suspect computer program's signature may be compared to signatures of known computer programs. The signatures for known computer programs may be stored in, for example, a database, a memory, etc. If the determined suspect computer program's signature matches a signature of a known computer program, the suspect computer program may be stored as a polymorphic variant (i.e., polymorph) of the known computer program at step S230.

Returning to step S220, if the suspect computer program's signature does not match a signature of a known computer program, the procedure may terminate.

Figure 3:
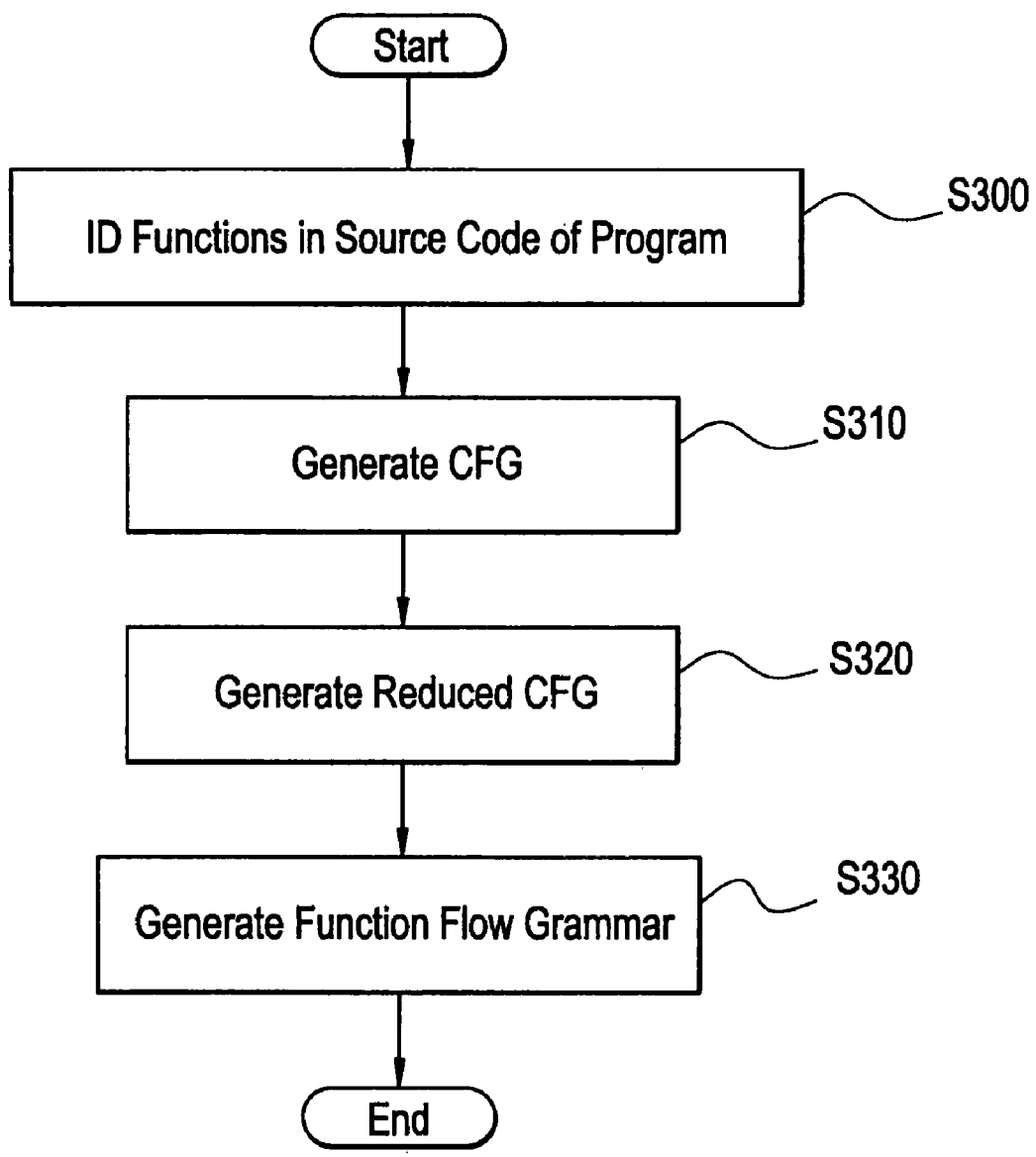
FIG. 3 shows a flow chart illustrating a method for determining a function flow grammar, according to an example embodiment of the present invention.

FIG. 3 illustrates an example of a method for generating function flow grammar for a source code of a computer program, according to an example embodiment of the present invention. It will be understood that the example embodiment of the method as illustrated in FIG. 3 may be implemented, for example, in the form of instructions store on a computer readable medium (e.g., a memory, cd-rom, etc.), which may be executed using any suitable computer platform.

For illustration purposes, the steps as illustrated in FIG. 3 will be described with reference to the source code of the "Simple" computer program shown below. However, it will be understood that example embodiments of the present invention may be used in connection with any computer program, including much more complex computer programs and/or computer viruses.

The Simple program is shown below.

```
void fun_B(int m)        {
                         int x1;
                         x1=5;
                         sscanf("3", "%d/n", &x1);
                         x1=5;
                         printf("%s/n", "system call");
                         }
void fun_A (int n)       {
                         int y1;
                         y1=10;
                         fun_B(y1);
                         printf("%s/n", "system call");
                         }
void main ( )            {
                         int x, y, z;
                         x=3;
                         y=2;
                         if (x<10){
                              fun_B(x);
                         fun_A(y);
                         printf("%s/n", "system call");
                         z=y+5;
                         }
        else             {
                         fun_B(y);
                         }
        y=x+1;
        }
```

At step S300, functions within the source code of the Simple computer program may be identified. For example, the functions included in the source code, as illustrated above, may be "fun_A", "fun_B", and "main". These functions may be identified in any suitable well-known manner, for example, by parsing through the source code using a computer executed algorithm or computer program.

At step S310, control flow graphs (e.g., control flow graphs 400A, 400B, and 400M of FIG. 4) may be generated for each of the functions fun_A, fun_B, and main identified within the source code of the Simple computer program. In general, a control flow graph may be a graph representing all possible paths in a function. For example, control flow graph 400M may be generated for the main function. In generating the control flow graph, elements of the function (e.g., functions, non-functions, etc.) may be identified. For example, the main function includes terminals x=3, y=2, z=y+5, and y=x+1, non-terminals fun_A and fun_B, a branch instruction (e.g., an if/then/else statement), and a jump. As illustrated in FIG. 4, each terminal, non-terminal, and jump in the control flow graph 400M may then be represented, graphically, by a vertex (e.g., the circles), while the branch instruction (e.g., the if/then/else statement) may be represented by a binary branch statement (e.g., the diamond). That is, the branch instruction may be represented by a decision tree with two possible paths (e.g., then and else). Each of the paths (e.g., then and else) may further represent a path or production (e.g., $M_1$ and $M_2$ in the function flow grammar, as will be described in more detail below. The control flow graph 400M may illustrate connections between elements of the main function through lines connecting vertices, branches, etc., and the control flow graph 400M may illustrate the flow of the main function from top to bottom Each of the functions fun_A and fun_B may also be represented by control flow graphs 400A and 400B, which may be generated in the same manner as discussed above with regard to the main function. The identifying of functions and/or generation of control flow graphs for the identified functions may also be generated in any other suitable well-known manner.

Returning to FIG. 3, at step S320, the control flow graphs for each of the identified functions may be reduced to generate reduced control flow graphs (e.g., the reduced control flow graphs 500A, 500B, and 500M of FIG. 5) for each of the functions fun_A, fun_B, and main. The reduced control flow graphs 500A, 500B, and 500M, as illustrated in FIG. 5, may be generated based on the control flow graphs 400A, 400B, and 400M, respectively, for example, by removing dynamic items (e.g., terminals, that is, non-function calls, etc.) from the control flow graphs 400A, 400B, and 400M. That is, the reduced control flow graphs 500A, 500B, and 500M may include static items (e.g., branch conditions, function calls, system calls, etc.), and may retain the structure of the control flow graphs 400A, 400B, and 400M, respectively.

For example, with regard to the control flow graph 400M, the terminals x=3, y=2, z=y+5, and y=x+1 may be removed from the control flow graph 400M thereby generating the reduced control flow graph 500M. As shown in FIG. 5, the reduced control flow graph 500M may include non-terminals fun_A and fun_B, a branch instruction (e.g., an if/then/else statement), and a jump. Although discussed above with regard to the reduced control flow graph 500M, it will be understood that the reduced control flow graphs 500A and 500B may also be generated in the same manner.

Returning to FIG. 3, at step S320, a function flow grammar may be generated for each of the paths or productions 510A, 510B, $M_1$, and $M_2$ in each of the reduced control flow graphs 500A, 500B, and 500M. For example, in generating function flow grammar for the main function, statements excluding function calls (a branch instructions, that is, the if/then/else statement and the jump may be removed form the reduced control flow graph 500M. Thus, the function flow grammar for the main function may include non-terminals fun_A and fun_B. Although discussed above with regard to the main function, it will be understood that the function flow grammar for the functions fun_A and fun_B may also be generated in the same manner.

A summary of symbolic representations for each instruction (e.g., function and/or system call) identified in the function flow grammar is illustrated in Table 1 below.

TABLE 1

| Symbolic Name | Symbolic Representation |
| --- | --- |
| Main | M |
| fun_B | B |
| fun_A | A |
| printf | P |
| sscanf | S |

Individual function flow grammar may be generated for each of the paths or productions 510A (in fun_A), 510B (in fun_B), $M_1$ (in main), and $M_2$ (in main). For example, $M_1$ may represent the then path or production of the branch instruction in the reduced control flow graph 500M (of FIG. 5). The path or production $M_1$, may include the calling of functions fun_B, and fun_A, system call printf, and may again call function fun_B, sequentially. Subsequently, the function flow grammar, using the symbolic names of Table 1, for the production (or path) $M_1$ may be B A B P, as illustrated below in Table 2. Each of the other productions $M_2$, A, B, P, and S, may be generated in the same manner as the function flow grammar for the production (or path) $M_1$.

Each of the paths or productions 510A, 510B, $M_1$, and $M_2$ in the function flow grammar may be represented, for example, as illustrated in Table 2 below. In Table 2 below, $\epsilon$ denotes a static element, for example, system calls "printf" and "sscanf".

TABLE 2

| Function | Symbolic representation of production | Production | Purpose |
| --- | --- | --- | --- |
| main | $M_1$ | B A P B | Used for the then path in main( ) |
| main | $M_2$ | B B | Used for the else path in main( ) |
| fun_A | A | B P | Used for fun_A( ) |
| fun_b | B | S P | Used for fun_B( ) |
| printf | P | $\epsilon$ | Used for printf( ) |
| sscanf | S | $\epsilon$ | Used for sscanf( ) |

As discussed above with regard to FIGS. 1 and 2, the function flow grammar $M_1$, $M_2$, A, B, P, and S may be used in generating signature for a computer program, for example, the Simple computer program as shown above.

An example embodiment of a method for generating a computer program signature using function flow grammar, as described herein, will be discussed in more detail with regard to FIG. 6. It will be understood that the example embodiment of the method as illustrated in FIG. 6 may be implemented, for example, in the form of instructions store on a computer readable medium (e.g., a memory, cd-rom, etc.), which may be executed using any suitable computer platform.

Figure 6:
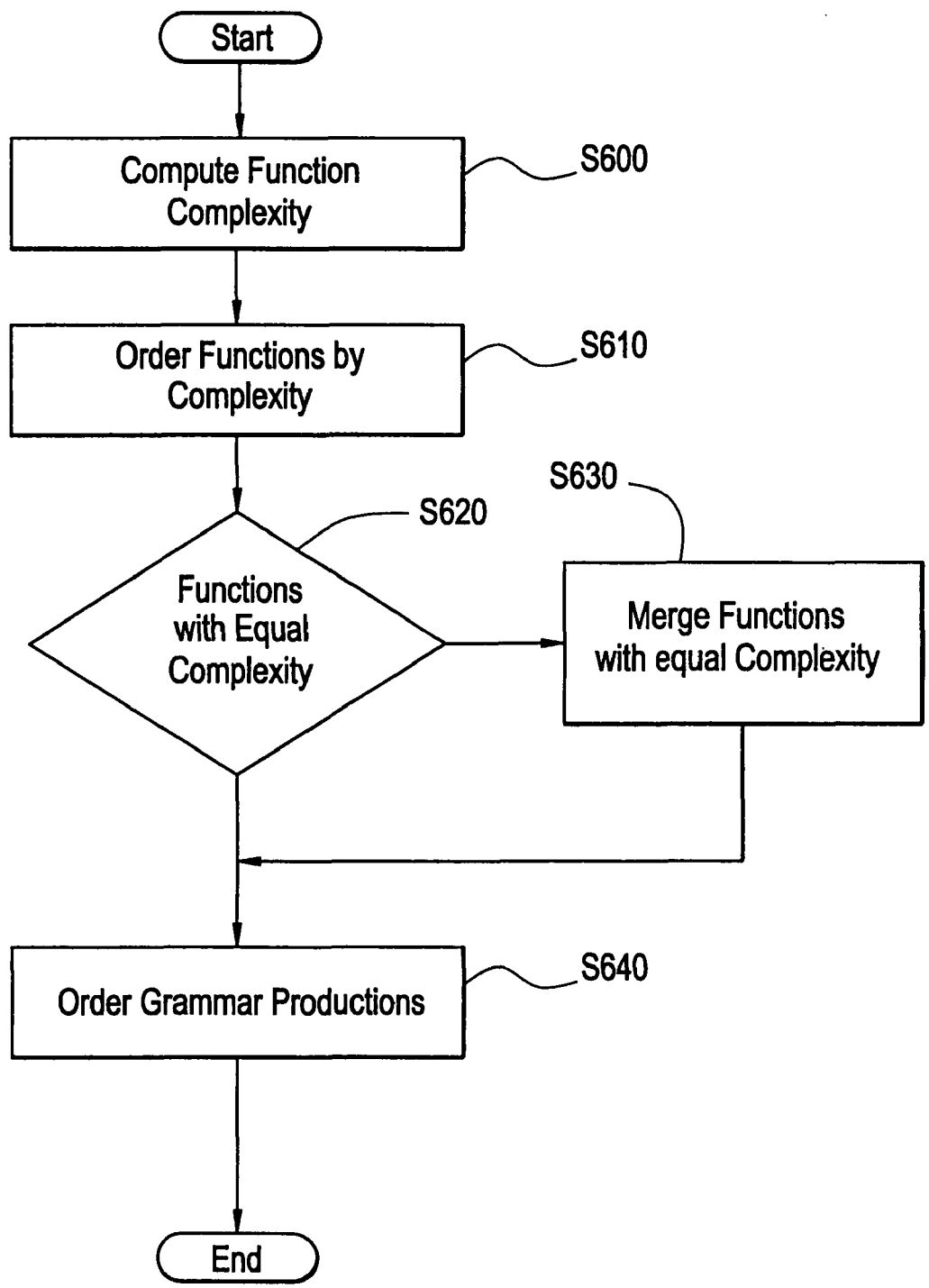
FIG. 6 shows a flow chart illustrating a method for detecting a polymorph of a known computer program, according to an example embodiment of the present invention.

FIG. 6 illustrates an example embodiment of a method for generating a computer program signature based on function flow grammar for a computer program, according to the present invention. For illustration purposes, generation of a computer program signature will be discussed with regard to the Simple computer program as shown above.

Referring to FIG. 6, after determining the function flow grammar for each production within the functions main, fun_A, fun_B, printf, and sscanf, a relative function complexity may be determined for each of the functions main, fun_A, fun_B, printf, and sscanf, at step S600.

In an example embodiment of the present invention, a relative complexity of a function may be determined based on the number of functions called within a given function. For example, with respect to the Simple computer program above, the main function 'M' may call functions fun_A and fun_B; function fun_A may call function fun_B; and function fun_B may include system calls printf and sscanf. An example of a relative complexity of each of the functions main, fun_A, and fun_B may be shown below in Table 3. A relative function complexity may not be computed for the static elements P and S, as they are system calls, and thus static elements P and S have been omitted from Table 3.

TABLE 3

| Function | Relative Complexity |
| --- | --- |
| M | 2 |
| A | 1 |
| B | 0 |

Figure 7:
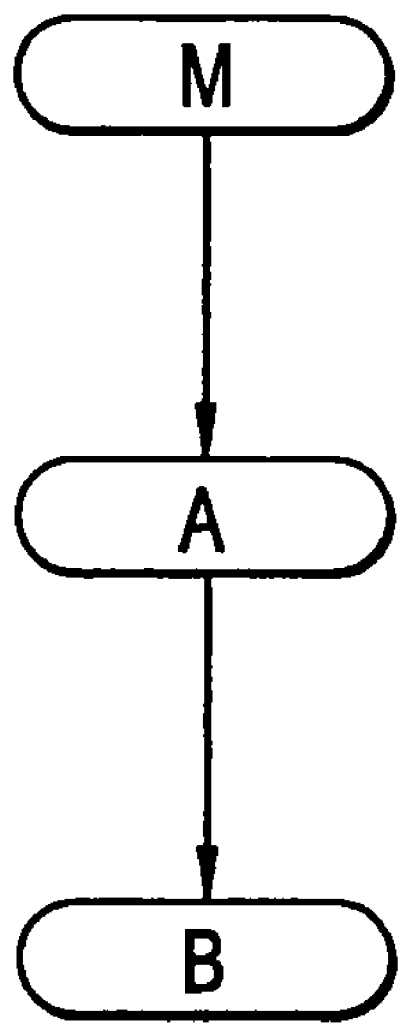
FIG. 7 illustrates an example partial order of functions within a source code of a computer program, according to an example embodiment of the present invention.

Returning to FIG. 6, at step S610, the functions main, fun_A, and fun_B, may be ordered according to each functions relative complexity in order to obtain a partial order of the Simple computer program. An example of the partial order of these functions is illustrated in FIG. 7.

At step S620, a determination may be made as to whether a computer program source code includes functions with equal relative complexity. If no functions have an equal relative complexity (as is the case in the Simple computer program) each production included in the function flow grammar, as shown above in Table 2, may be sorted internally, as shown below in Table 4.

TABLE 4

| Old Production | Internal Sort of Production |
| --- | --- |
| $M_1$: B A P B | $M_1$: A B B P |
| $M_2$: B B | $M_2$: B B |
| A: B P | A: B P |
| B: S P | B: S P |
| P: $\epsilon$ | P: $\epsilon$ |
| S: $\epsilon$ | S: $\epsilon$ |

As shown above in Table 4, the productions may be sorted internally based on the symbolic representation assigned to each of the functions in the Simple computer program, and the symbolic representations for each function may be assigned based on the original call order of the functions in the source code of the computer program. For example, the order of the function calls within the production '$M_1$' of the main function may be B, A, P, B. Accordingly, in step S640, the function calls within the production may be reordered, for example, alphabetically, to produce an ordered grammar production A, B, B, P. An example of the internally sorted grammar for productions $M_1$, $M_2$, A, and B is illustrated in Table 4. Although in the example as illustrated above, the productions have been sorted alphabetically, it will be understood that the function calls within any of the productions, as described herein, may be sorted in any other suitable manner.

The productions (e.g., $M_1$, $M_2$, A and B) may then be sorted in order to generate a computer program signature for the Simple computer program. For example, after internally sorting the productions $M_1$, $M_2$, A, and B the productions may be sorted, for example, alphabetically, producing the computer program signature, as illustrated below. Namely, the computer program signature illustrated below may be based on a total ordering of the functions within the computer program. Simple Computer Program Signature: A:BP-B:PS-M:ABBP-M:BB-P-S The generated Simple computer program signature may be stored in, for example, a database (or any other suitable storage medium) and/or compared to signatures of known computer programs (as illustrated in step S220 of FIG. 2).

Returning to FIG. 6, at step S620, if two or more functions within the source code of a computer program have equal relative complexities, the two or more functions may be given the same symbolic representation, which may effectively merge the two or more functions together into the same function. For example, with regard to the Simple computer program discussed above, assuming that functions fun_A and fun_B are identical. If the functions fun_A and fun_B are identical, each instance of fun_B may be replaced by function fun_A, producing the productions as shown below in Table 5.

TABLE 5

| Old Production | New Production (with merged functions) | Purpose |
| --- | --- | --- |
| $M_1$: B A P B | $M_1$: A A P A | Used for the then path in main( ) |
| $M_2$: B B | $M_2$: A A | Used for the else path in main( ) |
| A: B P | A: A P | Used for fun_A( ) |
| B: S P | A: S P | Used for fun_B( ) renamed to fun_A( ) |
| P: ϵ | P: ϵ | Used for printf( ) |
| S: ϵ | S: ϵ | Used for sscanf( ) |

At step S640, the productions may be internally sorted and externally ordered. Subsequently, a computer program signature may be generated, in the same manner as described above.

In example embodiments of the present invention, functions may be matched based on a total ordering of the functions within the source code of a computer program. As discussed above, functions may be sorted by their relative complexity, and given a symbolic representation (or name) based on the determined order. Functions with equal complexity may be given the same name, which may effectively merge the functions with equal complexity into a single function. This may result in a set of totally ordered functions.

The relative complexity of a function may be based on a quantitative analysis of the function. For example, the relative complexity (or sort criteria) of a function may be a tuple with a plurality of values, and/or may be a value calculated based on a control flow graph for a given function. Examples of values, which may be included in the tuple are:
  Number of System Calls
  Number of Function Calls
  Number of String Accesses
  Number of Nodes
  Number of Productions;
  Number of Merges; and
  Number of Branches.
Examples of values, which may be calculated may be:
  BFS-Height: this may be the length of the longest production induced by the function and/or the height of the breadth-first-search tree (BFS);
  BFS-Width: this may be the largest number of same-level nodes in a breadth-first search tree; and
  DFS-Width: this may be determined by the DFS-Width algorithm, which will be described in detail below.

In an example embodiment of the present invention, a DFS-Width algorithm may be used to determine a DFS-Width. The DFS-width may be used to determine a relative complexity of a given function. For example, initially, nodes furthest from the root node (e.g., (0,0)) on the left and the right, within a control flow graph for a given function, may be labeled L and R, respectively. L may the left-most distance from the root node on the path from the root to the node, and R may be the right-most distance. The graph may be labeled via a depth-first search (DFS).

Graph nodes may include one or two children, and each left child may have a value $N_L+1$, where $N_L$ may be a value of the parent node. Each right child may have a value $N_R+1$, where $N_R$ may be the value of the parent node. If a node has one child, the child may be given the same label as the parent. Width may be calculated as the sum of a maximum $N_L$ and a maximum $N_R$ within the control flow graph. This control flow graph width algorithm may determine identical graph widths for polymorphic instances of a given function. Maximum $N_L$ and $N_R$ values may be stored, for example, during labeling of the control flow graph.

Example embodiments of the present invention have been described with regard to source code of a computer program (e.g., the Simple computer program). However, it will be understood that example embodiments of the present invention may be applied to object code, for example, executable (.exe) files, etc.

The example embodiments of the present invention being thus described, it will be obvious that the same may be varied in many ways. Such variations are not to be regarded as a departure from the present invention, and all such modifications are intended to be included within the scope of the present invention.

We claim:

1. A method for detecting a polymorphic instance of a known computer program, the method comprising:
  generating at least one reduced control flow graph by reducing at least one control flow graph, the at least one control flow graph being based on identified functions within a suspect computer program;
  generating a function flow grammar including the identified functions associated with address information from the reduced control flow graph;
  generating a signature of the suspect computer program by ordering the identified functions included in the function flow grammar based on at least one characteristic associated with each function; and
  comparing the generated signature with a plurality of signatures for the known computer programs, which are based on a total ordering of functions within each of the known computer programs; wherein the generating and comparing steps are executed by a computer processor.

2. The method of claim 1, wherein the generating step further comprises:
  generating the function flow grammar including the identified functions associated with static address information based on the at least one control flow graph for the identified functions; and
  determining the signature of the suspect computer program by ordering the identified functions included in the function flow grammar based on the at least one characteristic associated with each function.

3. The method of claim 1, wherein the at least one characteristic is a relative complexity of each function in the function flow grammar.

4. The method of claim 3, wherein the relative complexity of each function is a tuple including at least one value.

5. The method of claim 3, wherein the relative complexity is based on a quantitative analysis of each individual function.

6. The method of claim 1, wherein the at least one characteristic is a label given to each function in the function flow grammar.

7. The method of claim 1, further comprising:
ordering the identified functions within the function flow grammar for the suspect computer program based on the at least one characteristic associated with each of the identified functions.

8. A method for determining a signature for a computer program, the method comprising:
generating at least one reduced control flow graph by reducing at least one control flow graph, the at least one control flow graph being based on identified functions within the computer program;
generating a function flow grammar including the identified functions associated with address information from the reduced control flow graph;
determining a signature of the computer program by ordering the identified functions included in the function flow grammar based on at least one characteristic associated with each function; wherein the determining step is executed by a computer processor.

9. The method of claim 8, wherein the determining step further comprises:
generating the function flow grammar including the identified functions associated with static address information based on the at least one control flow graph for the identified functions; and
determining the signature of the computer program by ordering the identified functions included in the function flow grammar based on the at least one characteristic associated with each function.

10. The method of claim 8, wherein the at least one characteristic is a relative complexity of each function in the function flow grammar.

11. The method of claim 10, wherein the relative complexity of each function is a tuple including at least one value.

12. The method of claim 10, wherein the relative complexity is based on a quantitative analysis of each function.

13. The method of claim 8, wherein the at least one characteristic is a label given to each function in the function flow grammar.

14. The method of claim 8, further comprising:
ordering the identified functions within the function flow grammar for the suspect computer program based on the at least one characteristic associated with each of the identified functions.

* * * * *